(12) United States Patent
Olson et al.

(10) Patent No.: US 9,711,173 B2
(45) Date of Patent: Jul. 18, 2017

(54) APPARATUS AND METHOD FOR SETTING SLIDER SURFACE POTENTIAL

(71) Applicant: Seagate Technology LLC, Cupertino, CA (US)

(72) Inventors: Daniel W. Olson, St. Louis Park, MN (US); Declan Macken, Eden Prairie, MN (US); Timothy William Stoebe, Minnetonka, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 15/414,269

(22) Filed: Jan. 24, 2017

(65) Prior Publication Data
US 2017/0154646 A1 Jun. 1, 2017

Related U.S. Application Data

(62) Division of application No. 14/560,253, filed on Dec. 4, 2014, now Pat. No. 9,558,773.

(51) Int. Cl.
G11B 5/60 (2006.01)
G11B 5/48 (2006.01)
G11B 33/14 (2006.01)
G11B 5/40 (2006.01)

(52) U.S. Cl.
CPC ............ G11B 5/607 (2013.01); G11B 5/4853 (2013.01); G11B 5/6094 (2013.01); G11B 33/14 (2013.01); G11B 33/144 (2013.01); G11B 33/1406 (2013.01); G11B 33/1433 (2013.01); G11B 5/40 (2013.01)

(58) Field of Classification Search
CPC ...... G01B 5/40; G01B 5/4853; G01B 33/144; G01B 33/1406; G01B 33/14; G01B 33/14331
USPC ....................................... 360/234.5
See application file for complete search history.

(56) References Cited

U.S. PATENT DOCUMENTS

| | | |
|---|---|---|
| 8,049,984 B2 | 11/2011 | Contreras et al. |
| 8,599,506 B2 | 12/2013 | Contreras et al. |
| 8,730,607 B1 | 5/2014 | Garzon et al. |
| 2004/0027728 A1 | 2/2004 | Coffey et al. |
| 2005/0088772 A1 | 4/2005 | Baumgart et al. |
| 2008/0219464 A1 | 9/2008 | Smith |
| 2008/0225426 A1 | 9/2008 | Roy et al. |
| 2010/0157454 A1 | 6/2010 | Chen et al. |
| 2011/0157736 A1 | 6/2011 | Contreras et al. |
| 2013/0286807 A1 | 10/2013 | Gao et al. |
| 2014/0023108 A1 | 1/2014 | Johnson et al. |
| 2015/0036469 A1 | 2/2015 | Johnson et al. |
| 2015/0085630 A1 | 3/2015 | Macken et al. |
| 2015/0085632 A1* | 3/2015 | Kiely et al. ............ G11B 5/41 369/53.38 |
| 2015/0162022 A1 | 6/2015 | Peng et al. |
| 2016/0163343 A1 | 6/2016 | Olson et al. |

* cited by examiner

*Primary Examiner* — Carlos E Garcia
(74) *Attorney, Agent, or Firm* — Hollingsworth Davis, LLC

(57) ABSTRACT

An apparatus includes a slider body of a disk drive. The slider body is electrically coupled to a plurality of end bond pads. A voltage applied to one more of the end bond pads sets a surface potential of the slider body.

20 Claims, 4 Drawing Sheets

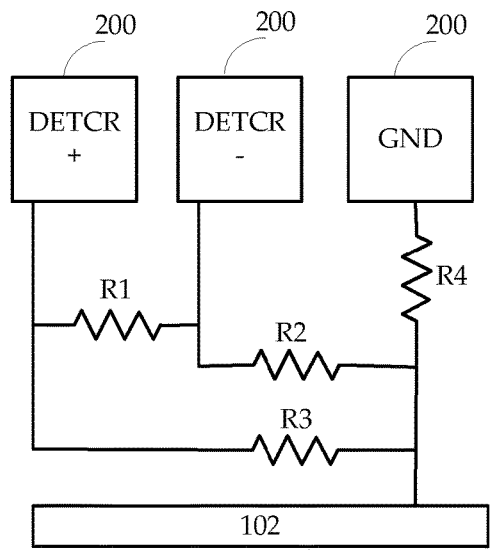
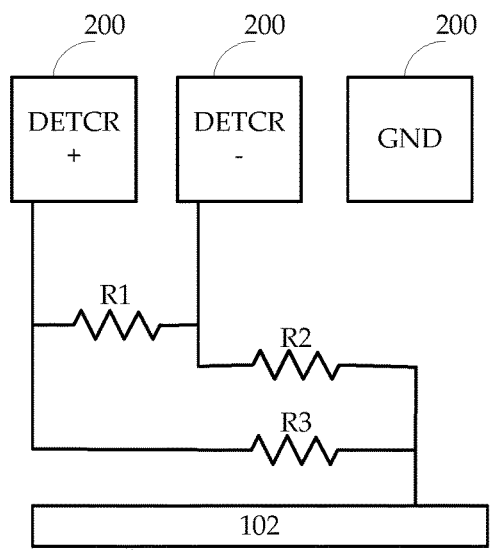
FIG. 3A                FIG. 3B
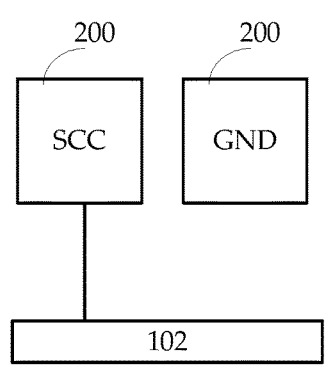
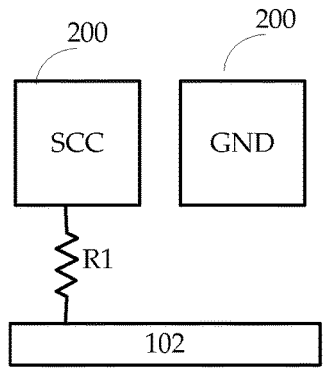
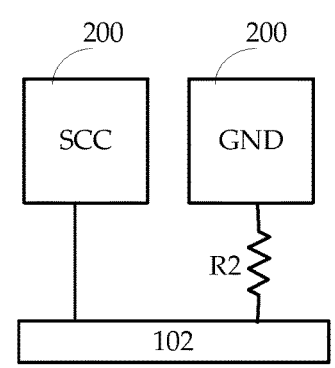
FIG. 4A        FIG. 4B        FIG. 4C

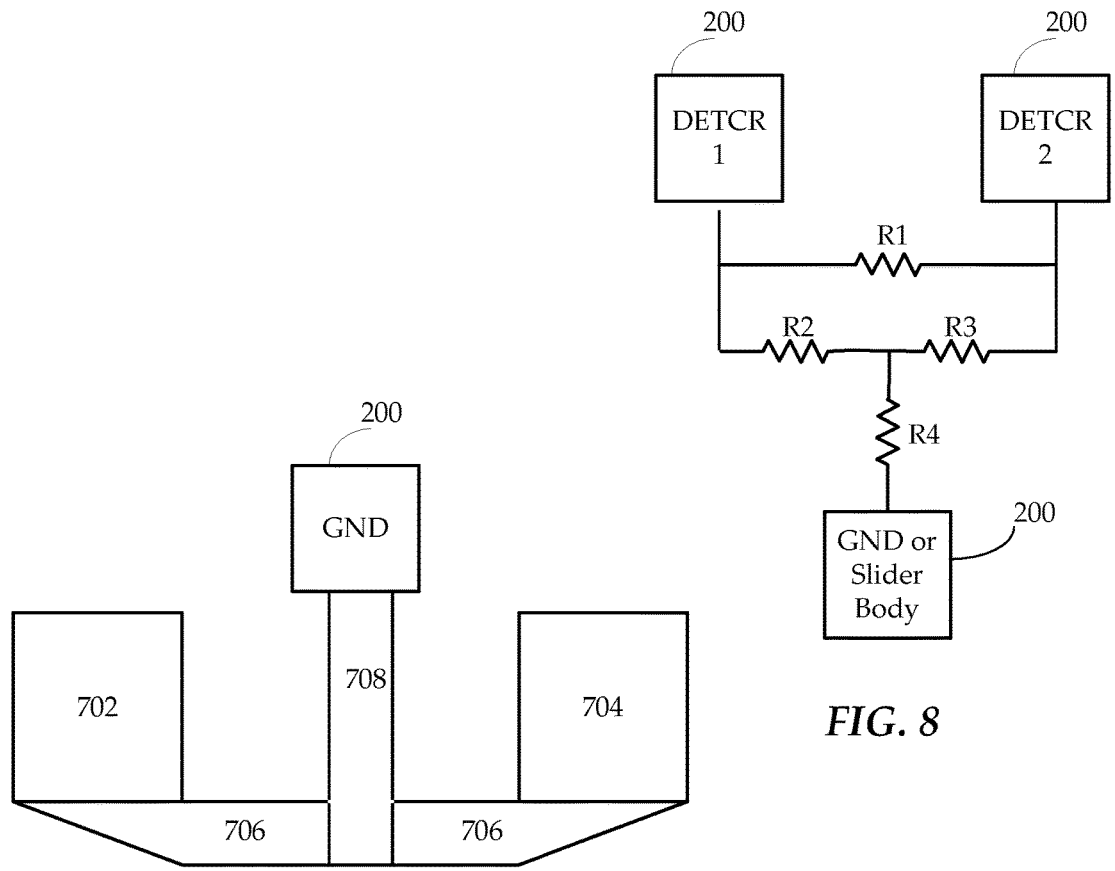
FIG. 8
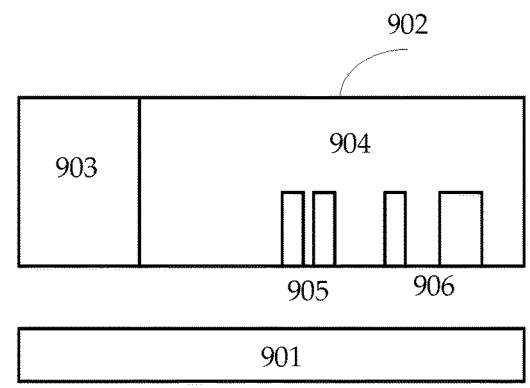
FIG. 7
FIG. 9

APPARATUS AND METHOD FOR SETTING SLIDER SURFACE POTENTIAL

RELATED PATENT DOCUMENTS

This application is a divisional of U.S. Ser. No. 14/560,253, filed Dec. 4, 2014, to which priority is claimed and which is hereby incorporated by reference in its entirety.

SUMMARY

An embodiment of the present disclosure includes an apparatus that comprises a slider body of a disk drive. The slider body is electrically coupled to a plurality of end bond pads. A voltage applied to one or more of the end bond pads sets a surface potential of the slider body.

A method embodiment of the present disclosure includes fabricating a slider body on a wafer, wherein the wafer includes a plurality of end bond pads that are electrically coupled to the slider body. The method further includes establishing a voltage delivery configuration at one or more of the end pads. The voltage delivery configuration is configured to set a surface potential of the slider body.

Another embodiment of the present disclosure includes a slider body and means for setting a surface potential of the slider body. The slider body is electrically coupled to a plurality of end bond pads and the means for setting surface potential of the slider body does so through use of at least one of the end bond pads.

The above summary is not intended to describe each embodiment or every implementation. A more complete understanding will become apparent and appreciated by referring to the following detailed description and claims in conjunction with the accompanying drawings.

BRIEF DESCRIPTION OF THE DRAWINGS

FIGS. 3A-3B illustrate configurations wherein various end bond pads and accompanying circuitry are used to establish slider body surface potential in accordance with disclosed embodiments.

FIGS. 4A-4C illustrate configurations wherein various end bond pads and accompanying circuitry are used to establish slider body surface potential in accordance with disclosed embodiments.

FIGS. 5-6B illustrate configurations wherein various end bond pads and accompanying circuitry are used to establish slider body surface potential in accordance with disclosed embodiments.

FIGS. 7-8 illustrate configurations for bleed resistor balancing in accordance with disclosed embodiments.

FIG. 9 illustrates a configuration for establishing a potential for metallic features on the air bearing surface of a slider in accordance with disclosed embodiments.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
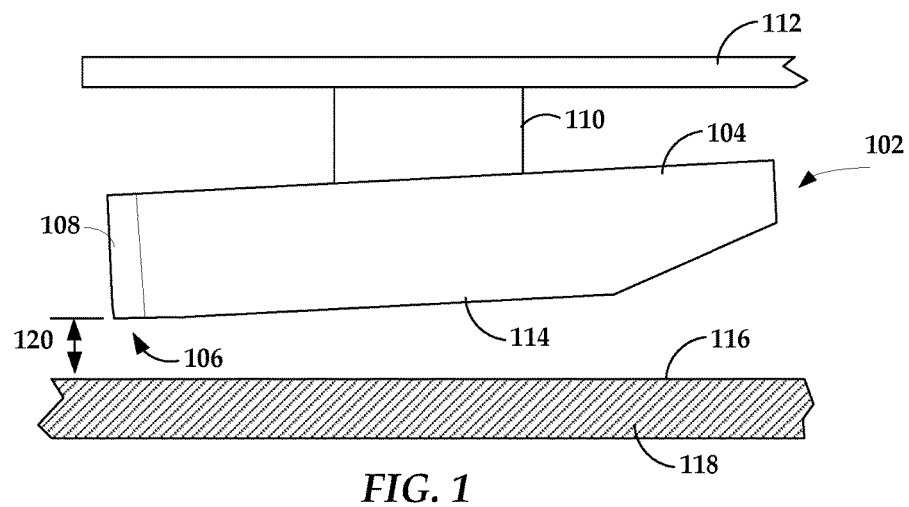
FIG. 1 is a schematic representation of a slider in which the various embodiments disclosed herein may be implemented.

The embodiments of the present disclosure are directed to systems and methods for setting surface potential of a slider of a disk drive. The systems and methods for setting and/or controlling surface potential can be achieved by making wafer-level changes to the read-write head circuitry, which includes applying a voltage at the end bond pads of the slider wafer.

The basic components of a hard disk drive (HDD) include a disk that is rotated, an actuator that moves a transducer to various locations on or over the disk, and electrical circuitry that is used to write and read data to and from the disk. Further, an HDD includes a microprocessor that controls most of the operations of the system. The microprocessor utilizes circuitry to encode data so that it can be successfully retrieved from and written to a medium on the disk.

The transducer translates electrical signals into magnetic field signals that actually record the data. The transducer is usually housed within a small ceramic block called a slider. The slider is passed over the rotating disk in close proximity to the disk. The transducer is used to read data from the disk or write information representing data to the disk.

Sliders are aerodynamically designed to fly on a cushion of air that is generated due to rotating the disks at high speeds. The slider has an air-bearing surface (ABS) that may include rails and a cavity or depression between the rails. The air-bearing surface is that surface of the slider nearest to the disk as the disk drive is operating. Air is dragged between the rails and the disk surface causing an increase in pressure that tends to force the head away from the disk. Air is simultaneously rushing past the cavity or depression in the air-bearing surface which produces a lower than ambient pressure area at the cavity or depression. The low-pressure area near the cavity counteracts the higher pressure at the rails. These opposing forces equilibrate so the slider flies over the surface of the disk at a particular fly height. The fly height is the distance between the disk surface and the transducing head. This distance is typically the same as the thickness of an air lubrication film. This film minimizes the friction and resulting wear that would occur if the transducing head and disk were in mechanical contact during disk rotation.

Information in the form of data is stored on the surface of the disks. The data is divided or grouped together on the disks in certain portions or tracks on the disks. In some disk drives the tracks are a multiplicity of concentric circular tracks. Disk drive systems are configured to read and write information that is stored on the disks in one or more of the tracks.

The transducers are in the form of read/write heads that are attached to the sliders. The transducers read and write information to/from the storage disks when the transducers are accurately positioned over one of the designated tracks on the surfaces of the storage disks. As the storage disks spin, the appropriate read/write head is accurately positioned above the target track where the read/write head is able to store data onto a track by writing information representative of data onto the one of the disks. Similarly, reading data on a storage disk is accomplished by positioning a read/write head above the proper track, and reading the stored material from one of the storage disks. In heat-assisted magnetic recording (HAMR), an energy source, e.g., a laser, is additionally provided upon or within the slider to aid in heating the disk prior to a write operation.

In order to write on (or read from) different tracks, the read/write head is moved radially across the tracks on the disk to a designated target track. Servo feedback information is used to accurately locate the transducer. The disk drive control system moves the actuator assembly to the appropriate position using the servo information. The servo information is also used to hold the transducer in a steady position during a read or write operation.

The best performance of the disk drive results when a slider is flown as closely to the surface of a disk as possible. During operation of a disk drive, the distance between the slider and the disk is very small, on the order of several nanometers. The constant demand for increasing hard drive recording density has resulted in a drastic decrease in fly height over the years. Variation in the fly height represents an increasingly complicated source of problems due to head/media intermittent contact. Intermittent contact induces vibrations that are detrimental to the reading/writing quality and may also eventually result in a head crash that causes the loss of data.

The slider body may be formed from a ceramic wafer. The transducers are built on the wafer using conventional semiconductor processing techniques. The transducers are then encapsulated in an overcoat such as alumina. The wafer is sliced to form rows of individual heads and subsequently lapped to an appropriate dimension and surface finish. The individual heads are then diced from the rows to form individual sliders.

The interface between the alumina and the substrate typically includes the closest point between the slider and the disk when the slider is passing over the surface of the disk in transducing relation. As a result, if there is any variation in the fly height, this closest point is a likely contact point between the slider and the disk.

One source of variation in the fly height results from the differences in thermal expansion between the ceramic substrate and the transducer during operation of the disk drive. Due to intrinsic properties, the ceramic substrate and the transducer expand at different rates as the slider heats up. The differences in expansion cause the transducer to move closer to the disk surface than the substrate that is near the transducer. This change in spacing can affect the fly height of the slider. The varying fly height can cause poor disk drive performance during reading and writing operations. In addition, if the fly height becomes too small, there is likely to be contact between the slider and the disk during operation of the disk drive.

Figure 2:
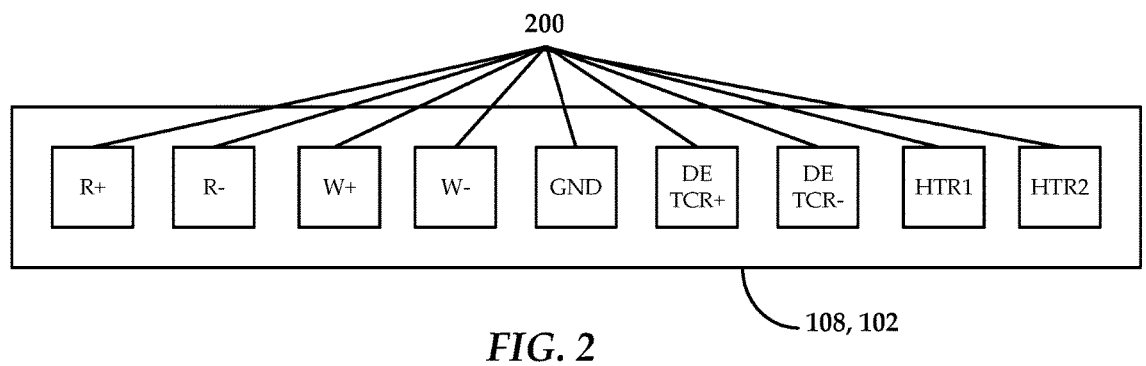
FIG. 2 is a schematic representation of end bond pads on the trailing edge of the slider of FIG. 1.

Other sources of variation in the fly height that can negatively affect the fly-height of the slider are lubricant-slider interaction, such as lube pickup, and electrostatic force. The negative effects of both of these items can be diminished and/or eliminated by controlling the voltage potential of the slider with respect to the potential of the disk. Therefore, controlling the voltage of the slider reduces slider wear and allows for lower flying-heights A side view of a slider 102 is illustrated in FIG. 1. The slider 102 includes a slider body 104 and a transducer portion 106 provided within overcoat 108 at the trailing edge of the slider 102. The slider 102 is attached via suspension 110 to an arm 112. The air bearing surface 114 of the slider 102 is shown proximate the surface 116 of a disk 118. The fly height 120 is also indicated. FIG. 2 illustrates the bond pads 200 on the trailing edge of the slider 102. These bond pads 200 are directly connected through the overcoat 108 to various components, e.g., reader, writer, heater, and temperature sensor, within the slider 102. The configuration of FIG. 2 illustrates the current industry standard of nine pads which include bond pads R+ and R− for the reader, W+ and W− for the writer, GND for ground (which defines the ground potential of the slider body 102), DETCR+ and DETCR− for the temperature sensor (in this instance a dual-ended temperature coefficient of resistance sensor), and HTR1 and HTR2 for the heaters. During fabrication of an HDD 102, the bond pads are electrically connected to the electrical connections (e.g., traces) along the suspension 110. Typically, a conventional gold ball soldering operation is used to make the electrical connections from the bond pads of the slider 102 to the electrical connections of the suspension 110. It should be noted that more or less bond pads may be used as appropriate to a specific application, e.g., the need for a dedicated bond pad, additional bond pads to accommodate additional readers, writers, heaters or sensors, additional bond pads to accommodate a HAMR laser, etc.

The embodiments presented herein below involve modifications to the wafer layout to enable surface potential setting/surface charge control of the slider 102. FIGS. 3A-6 show the various end bond pad 200 configurations through which voltage may be applied to set the surface potential of the slider 102. FIG. 3A illustrates an embodiment wherein the end bond pads 200 and circuitry of a DETCR temperature sensor, which is modified by utilizing a common mode voltage that is bled to ground, are used to establish the surface potential of the slider 102 body. The DETCR circuit uses a differential voltage across two end bond pads 200, DETCR+ and DETCR−, to sense thermal fluctuations at a resistive element, R1. Modifying the circuit and adding a common mode voltage to both end bond pads 200, DETCR+ and DETCR−, through use of resistors R2 and R3, allows this common mode voltage to appear on the slider 102 body; the common mode voltage is bled to ground 200, GND, through resistor R4. In addition to the common mode voltage, a differential voltage can be applied across the DETCR end bond pads 200, DETCR+ and DETCR−, enabling the primary function of the DETCR, e.g., sensing thermal fluctuations. FIG. 3B illustrates an alternative embodiment of the DETCR end bond pad 200 configuration of FIG. 3A wherein the common mode voltage is isolated from ground 200, GND, i.e., resistor R4 has been eliminated and the DETCR circuit is not connected to ground, GND; however, the common mode voltage, through use of resistors R2 and R3, may still be used to set a voltage on the slider 102 body.

FIGS. 4A-4C illustrate additional embodiments for setting/controlling surface potential of the slider 102 body through use of end bond pads 200. In FIG. 4A, surface potential is set by the voltage applied to a dedicated end bond pad 200, SCC (surface charge control). In FIG. 4B, a resistor R1 is fabricated between the dedicated end bond pad 200, SCC, and the slider 102 body wherein the voltage applied through the resistor R1 to the dedicated end bond pad 200, SCC, establishes the slider 102 surface potential. In FIG. 4C, a resistor R2 is included between the slider 102 and ground 200, GND, such that a fraction of the voltage applied to the dedicated end bond pad 200, SCC, is bled to ground 200, GND, and the remaining voltage establishes the slider 102 surface potential.

Figure 5:
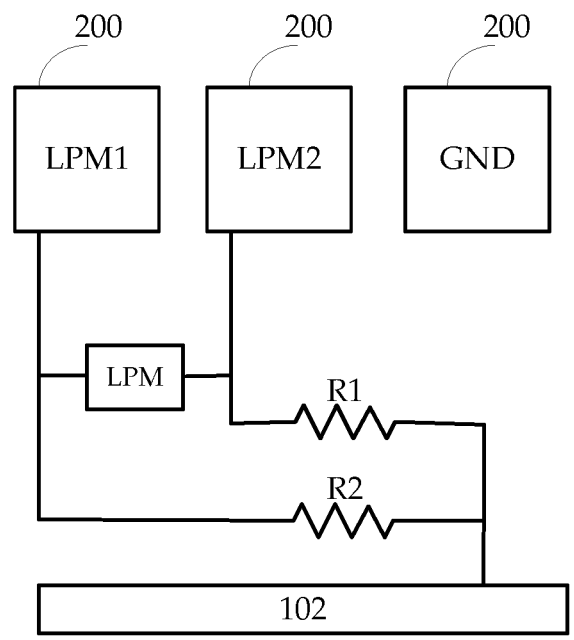

FIG. 5 illustrates another embodiment where the surface potential of a slider 102 is established through use of end bond pads 200. In this instance, the slider 102 comprises an element of a HAMR disk drive where an energy source, e.g., a laser, is mounted within or upon the slider 102 to provide heating to an underlying magnetic recording medium prior to or during a write operation. The use of a laser requires modification of the end bond pads 200 to include laser power monitor end bond pads 200, LPM1 and LPM2. The laser power monitor element, LPM, may be: (1) a thermal coefficient of resistance temperature sensor, e.g., a DETCR; (2) a thermocouple temperature sensor; or (3) a photodiode. Each of these elements work based on a differential voltage, thus a common mode voltage applied to both end bond pad 200 terminals, LPM1 and LPM2, through resistors R1 and R2, does not interfere with the laser power monitor, LPM, primary function of monitoring laser power.

Figures 6A, 6B:
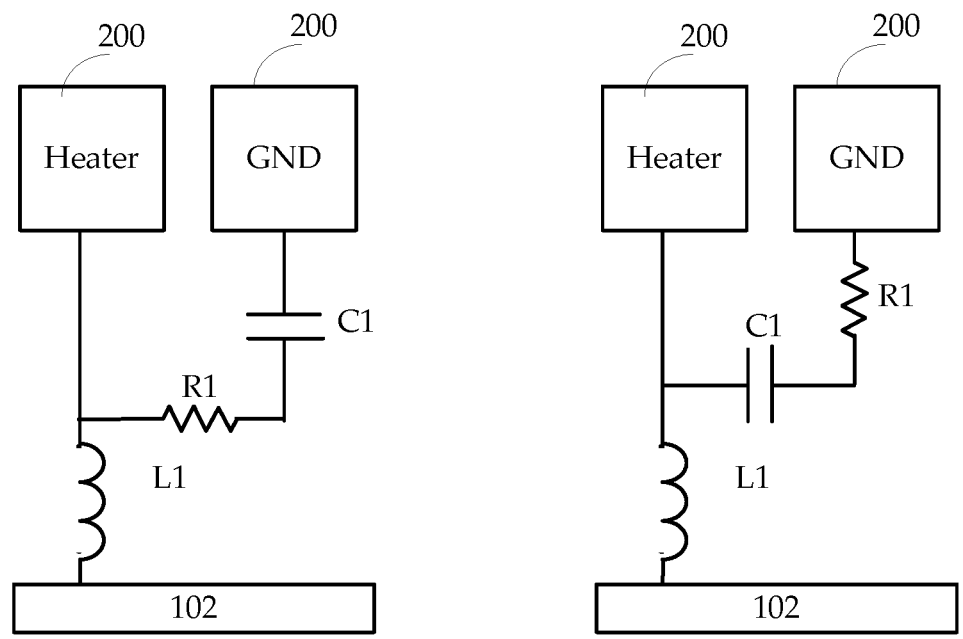

FIGS. 6A-6B illustrate embodiments wherein the DC voltage of an AC signal is used to establish the surface potential of the slider 102. In this configuration, an AC heater signal is injected into the circuit via the heater end bond pad 200, HTR. An inductor L1 allows the passage of the DC voltage of the AC signal to charge/establish the slider potential of the slider 102. The combination of a resistor and capacitor, e.g., R1-C1 (FIG. 6A) or C1-R1 (FIG. 6B), connects the heater circuit to ground 200, GND. The capacitor C1 allows passage of the AC signal required to power the heater. The heater is located in the circuit at a position beyond where the DC signal and AC signal diverge to ensure the heater is exclusively drive by the AC signal as the heater can respond to both an AC signal and a DC signal.

As noted above, it may be desirable to bias the slider 102 body through use of end bond pads 200 with an AC voltage. Applying a common mode voltage to a differential sensor such as the DETCR or laser power monitor can lead to noise in the differential sensor signal if the bleed resistors on the circuit are imbalanced. In the case of imbalanced bleed resistors, the electrical impedance is different between the sensor ends and ground. Because of this difference, a common mode voltage applied to both ends of the sensor will result in a differential voltage between the ends of the sensor. This differential voltage is interpreted as a sensor signal, reducing the signal-to-noise ratio of the sensor. Various schemes to improve the bleed resistor balancing enable AC biasing of the slider body. Two possible schemes are illustrated in FIGS. 7 and 8, which are further described below.

FIG. 7 illustrates a design for enhanced bleed resistor balancing. Large low resistance contacts are shown as items 702 and 704. As an example, a DETCR sensor, which is a resistive sensor, includes sensor resistance primarily in the region identified as item 706. The circuit is bled from the center of the DETCR resistive sensor, along region 708, which is made of a material with higher electrical resistivity than the sensor region 706. The bleeder feature is placed in the center of the sensor region 706 so that the resistance between either contact (702, 704) and ground 200, GND, are equal.

A second scheme for enhancing bleed resistor balancing is disclosed with reference to FIG. 8. Again, the DETCR sensor is used as an example. This application is not limited to DETCR, but can also be applied to a magnetic read sensor, laser power monitor, or any other sensor in the head. In FIG. 8, resistor R1 is the sensor region of the circuit. A differential voltage across resister R1 is used as a sensor signal. The bleed resistance path includes resistors R2, R3 and R4. In this embodiment, bleed resistor R4 is common to both ends of the sensor circuit. This enhances bleed resistor balancing because this single feature contributes the same electrical resistance to both ends of the sensor. Resistors R2 and R3 should be built to be as equal as possible in terms of resistance. The sum of resistances R2 and R3 is balanced against the sensor resistance R1. The resistance of R2 plus R3 should be large enough to prevent signal degradation due to decreased current flow across resistor R1.

The surface potential of metal features on the air bearing surface can be controlled along with the control of the slider body surface potential. In FIG. 9, the recording media is shown as 901. The slider body 902 flies above the recording media 901 and is supported by an air bearing. The techniques described earlier provide ways for setting the potential on the conductive portion 903 of the slider body 902. Material 904 within the slider body 902 is non-conductive but contains within it conductive structures 905 and 906. In this example, item 905 corresponds to the metallic reader shields while item 906 corresponds to the metallic writer shields. However, this concept is applicable to any conducting structure on the surface of the slider facing the recording media 901. Metallic reader shields 905 and metallic writer shields 906 may be electrically connected to the conductive portion 903 of the slider body 902 to match the potential applied to the conductive portion 903 of the slider body 902. Alternatively, metallic reader shields 905 and metallic writer shields 906 may be electrically connected to the ground and maintain a potential different from the conductive portion 903 of the slider body 902.

Systems, devices or methods disclosed herein may include one or more of the features structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality.

Various modifications and additions can be made to the disclosed embodiments discussed above. Accordingly, the scope of the present disclosure should not be limited by the particular embodiments described above, but should be defined only by the claims set forth below and equivalents thereof.

The invention claimed is:

1. An apparatus, comprising:
   a laser;
   a slider configured for heat-assisted magnetic recording and comprising a slider body, the slider body comprising a plurality of bond pads and a conductive portion; and
   a laser power monitor comprising a first end coupled to a first bond pad and a second end coupled to a second bond pad, the laser power monitor configured to sense light generated by the laser in response to a differential voltage across the first and second bond pads, and the laser power monitor configured to set a surface potential of the conductive portion of the slider body in response to a common mode voltage applied to the first and second bond pads.

2. The apparatus of claim 1, comprising a resistor arrangement coupled to the laser power monitor and the conductive portion of the slider body.

3. The apparatus of claim 1, comprising:
   a first resistor coupled between the first end of the laser power monitor and the conductive portion of the slider body; and
   a second resistor coupled between the second end of the laser power monitor and the conductive portion of the slider body.

4. The apparatus of claim 1, wherein the laser power monitor comprises a thermal sensor.

5. The apparatus of claim 1, wherein the laser power monitor comprises a resistive element having a temperature coefficient of resistance.

6. The apparatus of claim 1, wherein the laser power monitor comprises a dual-ended temperature coefficient of resistance (DETCR).

7. The apparatus of claim 1, wherein the laser power monitor comprises a thermocouple.

8. The apparatus of claim 1, wherein the laser power monitor comprises a photodiode.

9. The apparatus of claim 1, wherein:
the slider body comprises reader shields and writer shields; and
the conductive portion of the slider body is spaced from the reader shields and writer shields.

10. The apparatus of claim 9, wherein the conductive portion of the slider body is electrically coupled to the reader shields and writer shields.

11. An apparatus, comprising:
a laser;
a slider configured for heat-assisted magnetic recording and comprising a slider body, the slider body comprising a plurality of bond pads and a conductive portion; and
a laser power monitor comprising a first end coupled to a first bond pad and a second end coupled to a second bond pad, the laser power monitor configured to sense light generated by the laser in a first mode and to set a surface potential of the conductive portion of the slider body in a second mode;
wherein the first mode is activated in response to a first voltage state of the first and second bond pads, and the second mode is activated in response to a second voltage state of the first and second bond pads.

12. The apparatus of claim 11, wherein the first voltage state is a differential voltage state, and the second voltage state is a common mode voltage state.

13. The apparatus of claim 11, comprising a resistor arrangement coupled to the laser power monitor and the conductive portion of the slider body.

14. The apparatus of claim 11, comprising:
a first resistor coupled between the first end of the laser power monitor and the conductive portion of the slider body; and
a second resistor coupled between the second end of the laser power monitor and the conductive portion of the slider body.

15. The apparatus of claim 11, wherein the laser power monitor comprises a thermal sensor.

16. The apparatus of claim 11, wherein the laser power monitor comprises a resistive element having a temperature coefficient of resistance.

17. The apparatus of claim 11, wherein the laser power monitor comprises a thermocouple.

18. The apparatus of claim 11, wherein the laser power monitor comprises a photodiode.

19. The apparatus of claim 11, wherein:
the slider body comprises reader shields and writer shields; and
the conductive portion of the slider body is spaced from the reader shields and writer shields.

20. The apparatus of claim 19, wherein the conductive portion of the slider body is electrically coupled to the reader shields and writer shields.

* * * * *